(12) United States Patent
Park et al.

(10) Patent No.: US 12,290,108 B2
(45) Date of Patent: May 6, 2025

(54) AEROSOL GENERATING DEVICE

(71) Applicant: KT&G CORPORATION, Daejeon (KR)

(72) Inventors: Ju Eon Park, Seoul (KR); Min Kyu Kim, Seoul (KR); Jong Sub Lee, Gyeonggi-do (KR); Byung Sung Cho, Gyeonggi-do (KR)

(73) Assignee: KT&G CORPORATION, Daejeon (KR)

(*) Notice: Subject to any disclaimer, the term of this patent is extended or adjusted under 35 U.S.C. 154(b) by 368 days.

(21) Appl. No.: 17/793,446

(22) PCT Filed: Oct. 21, 2021

(86) PCT No.: PCT/KR2021/014783
§ 371 (c)(1),
(2) Date: Jul. 18, 2022

(87) PCT Pub. No.: WO2022/092698
PCT Pub. Date: May 5, 2022

(65) Prior Publication Data
US 2023/0045457 A1    Feb. 9, 2023

(30) Foreign Application Priority Data
Oct. 26, 2020    (KR) .................. 10-2020-0139288

(51) Int. Cl.
*A24F 40/51* (2020.01)
*A24F 40/10* (2020.01)
(Continued)

(52) U.S. Cl.
CPC .............. *A24F 40/51* (2020.01); *A24F 40/10* (2020.01); *A24F 40/42* (2020.01); *A24F 40/465* (2020.01)

(58) Field of Classification Search
CPC .......... A24F 40/51; A24F 40/10; A24F 40/42; A24F 40/465; A24F 40/53; A24F 40/50; A24F 7/00; G01F 23/263; G01F 23/268
See application file for complete search history.

(56) References Cited

U.S. PATENT DOCUMENTS 10,952,473 B2    3/2021    Bessant et al.
11,602,019 B2    3/2023    Reevell
(Continued)

FOREIGN PATENT DOCUMENTS

CN    107949286 A    4/2018
CN    108697166 A    10/2018
(Continued)

OTHER PUBLICATIONS

International Search Report for PCT/KR2021/014783 dated Feb. 3, 2022.
(Continued)

*Primary Examiner* — Edwin A. Leon
(74) *Attorney, Agent, or Firm* — Foley & Lardner LLP

(57) ABSTRACT

An aerosol generating device includes: a liquid storage configured to store an aerosol generating material; a first residual amount detection sensor and a second residual amount detection sensor respectively arranged on a first inner surface and a second inner surface that face each other among inner surfaces of the liquid storage; a third residual amount detection sensor and a fourth residual amount detection sensor respectively arranged on a third inner surface and a fourth inner surface of the liquid storage that face each other and are different from the first inner surface and the second inner surface of the liquid storage; and a controller configured to measure a remaining amount of the aerosol generating material based on a first detected value output by the first residual amount detection sensor and a second (Continued)

detected value output by the second residual amount detection sensor.

11 Claims, 10 Drawing Sheets

(51) Int. Cl.
    *A24F 40/42*     (2020.01)
    *A24F 40/465*     (2020.01)

(56) References Cited

U.S. PATENT DOCUMENTS

| | | | |
|---|---|---|---|
| 12,127,599 | B2 | 10/2024 | Reevell |
| 2017/0071253 | A1 | 3/2017 | Revell |
| 2018/0177238 | A1* | 6/2018 | Bessant .................... G01C 9/18 |
| 2018/0242644 | A1* | 8/2018 | Bessant .................... H05B 3/34 |
| 2018/0338537 | A1 | 11/2018 | Yan et al. |
| 2019/0269176 | A1 | 9/2019 | Dahlmann |
| 2020/0237004 | A1 | 7/2020 | Larsen |
| 2020/0367568 | A1 | 11/2020 | Lim et al. |
| 2021/0199432 | A1 | 7/2021 | Bessant et al. |
| 2021/0251295 | A1 | 8/2021 | Mironov et al. |
| 2022/0003589 | A1* | 1/2022 | Zorzetto ............... G01F 23/263 |
| 2023/0135876 | A1* | 5/2023 | Mei ......................... A24F 40/42 |
| | | | 131/330 |

FOREIGN PATENT DOCUMENTS

| | | |
|---|---|---|
| CN | 110022705 A | 7/2019 |
| CN | 111759016 A | 10/2020 |
| CN | 111759017 A | 10/2020 |
| CN | 111787821 A | 10/2020 |
| EP | 3 818 895 A1 | 5/2021 |
| KR | 10-1820847 B1 | 1/2018 |
| KR | 10-2018-0053649 A | 5/2018 |
| KR | 20190051785 A | 5/2019 |
| KR | 10-2019-0089908 A | 7/2019 |
| KR | 10-2020-0037790 A | 4/2020 |
| KR | 10-2020-0089149 A | 7/2020 |
| WO | 2017/137505 A1 | 8/2017 |
| WO | 2020/149503 A1 | 7/2020 |

OTHER PUBLICATIONS

Written Opinion for PCT/KR2021/014783 dated Feb. 3, 2022.
Extended European Search Report dated May 12, 2023 in Application No. 21886692.9.
First Office Action on Chinese Application No. 202180015749.1 dated Aug. 29, 2024 (17 Pages).

* cited by examiner

[Figure 1]
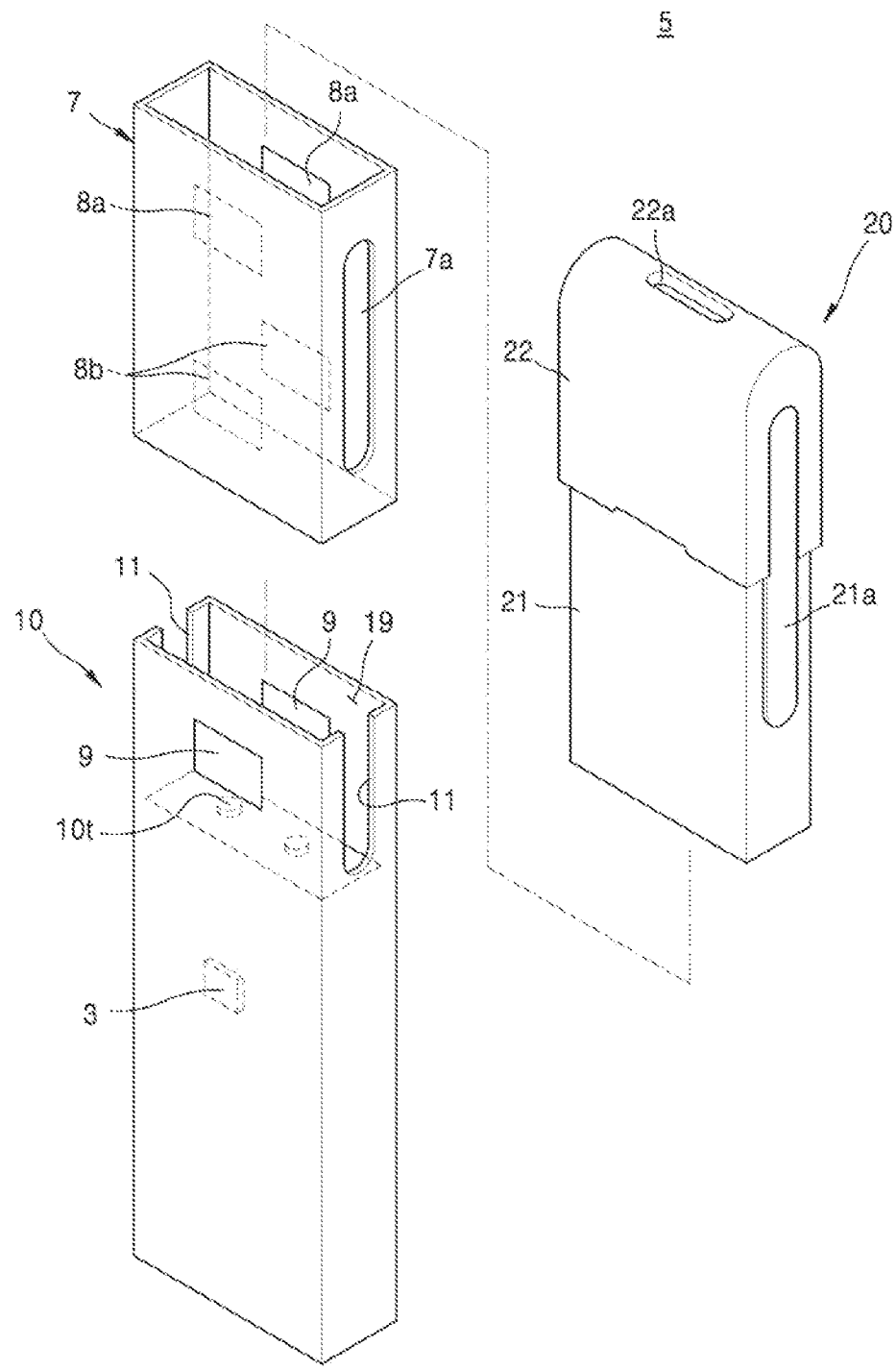

[Figure 2]
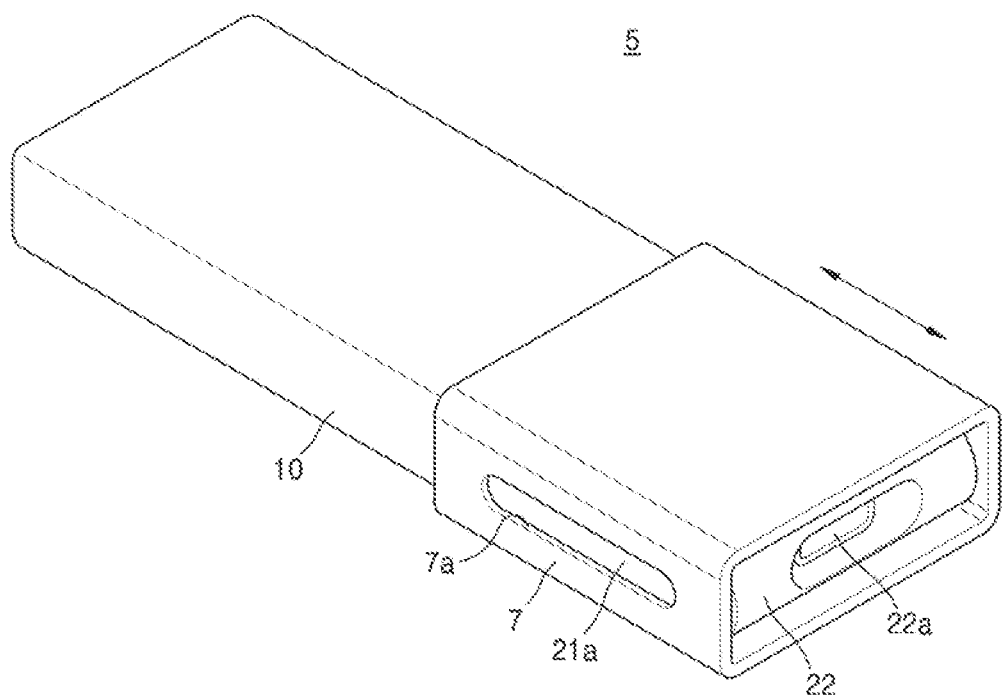
[Figure 3]
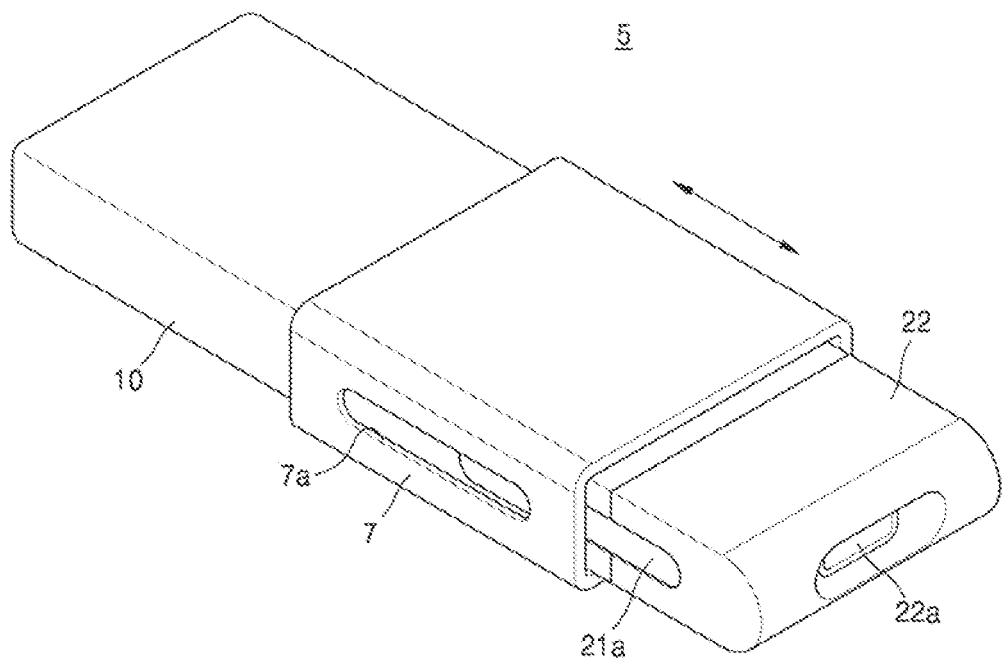

[Figure 4]
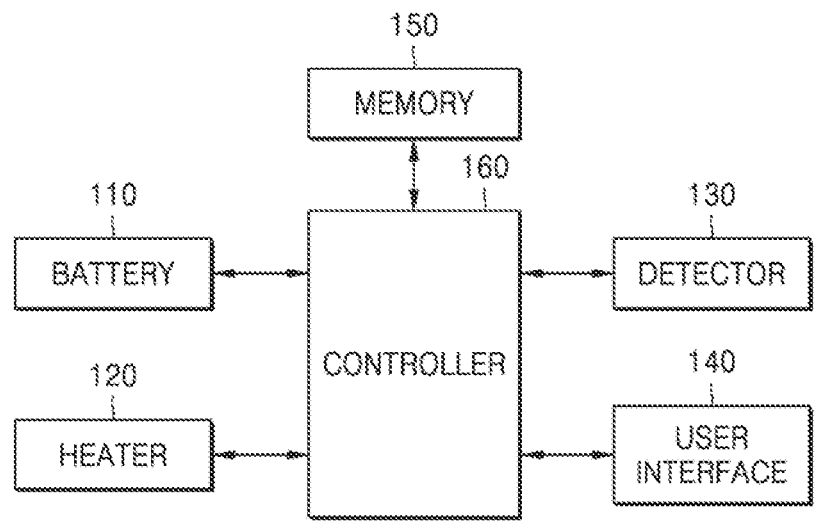
[Figure 5]
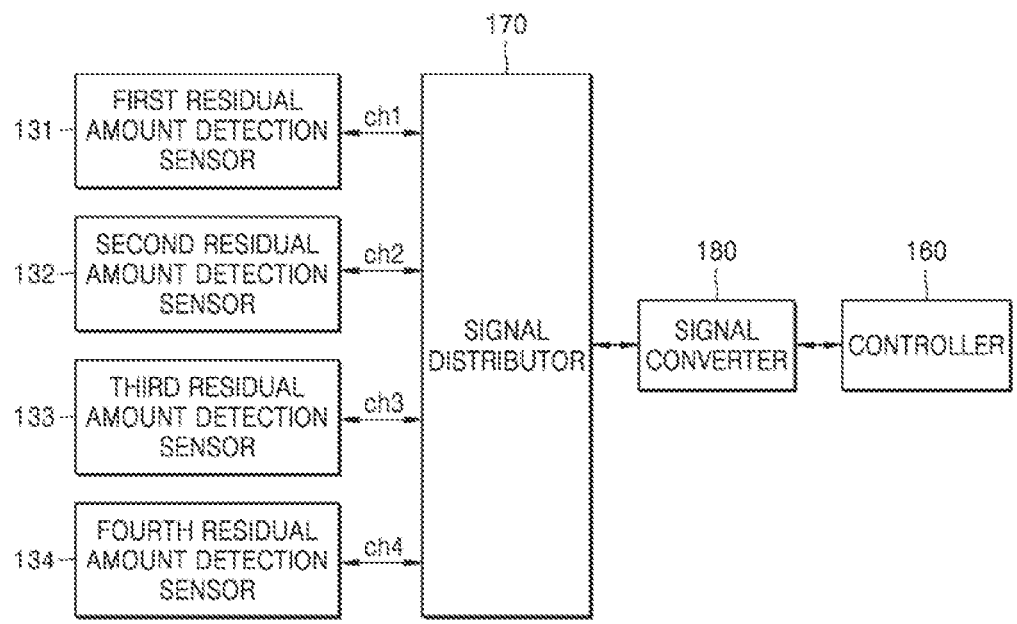

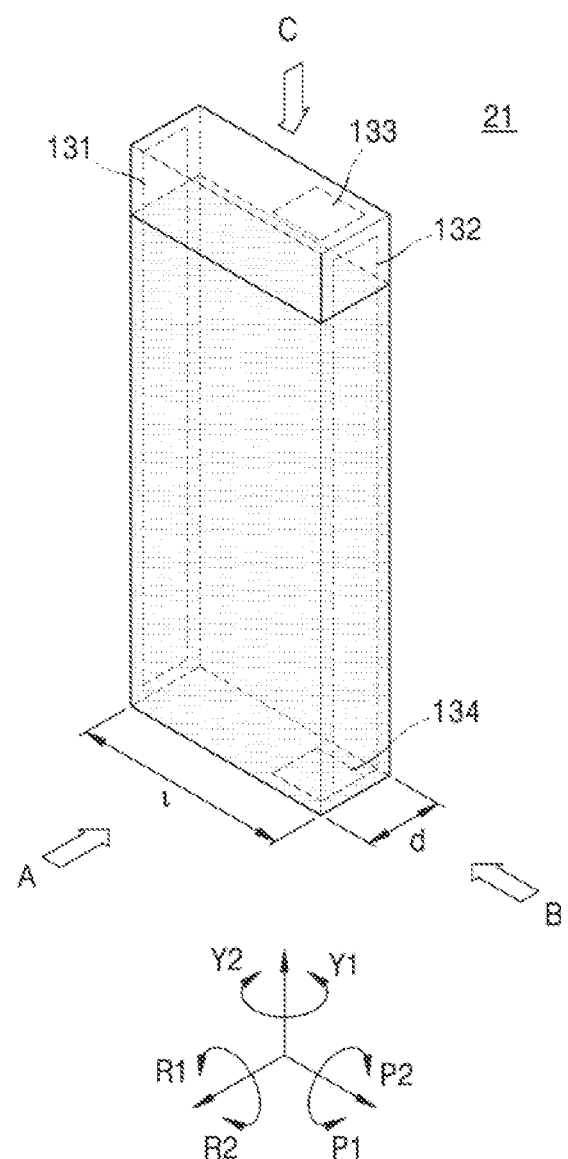
[Figure 6]

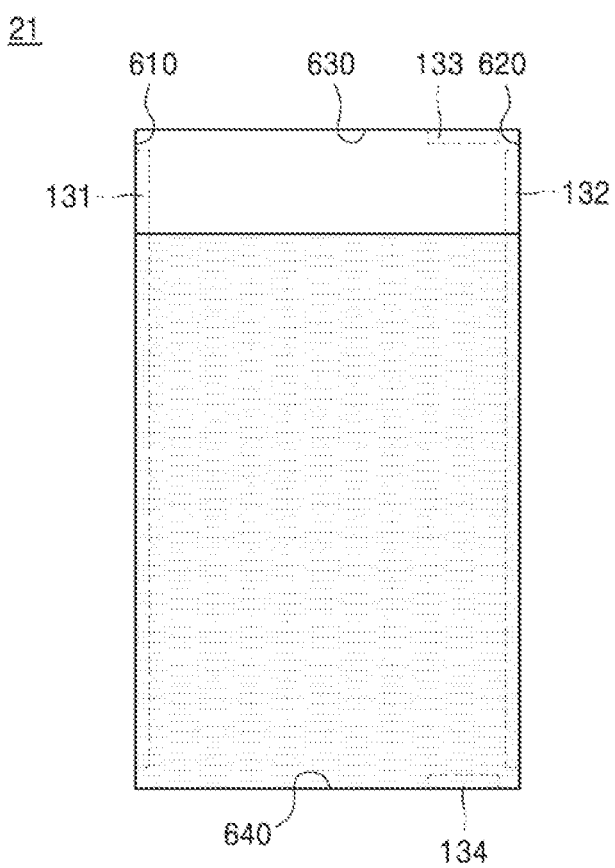
[Figure 7]

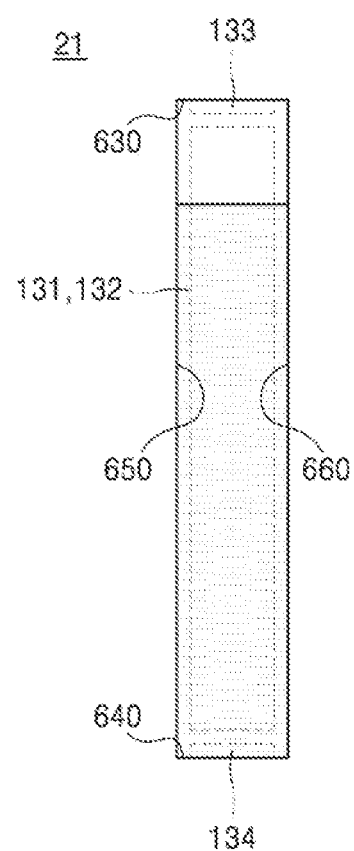
[Figure 8]

[Figure 9]
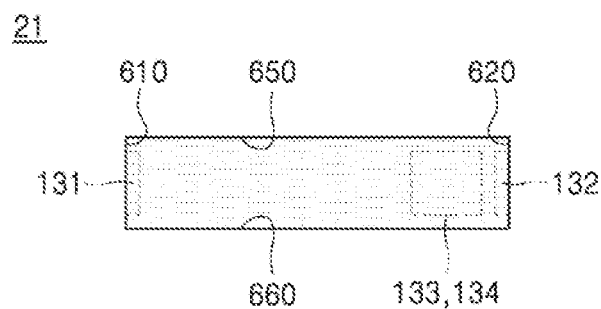

[Figure 10]
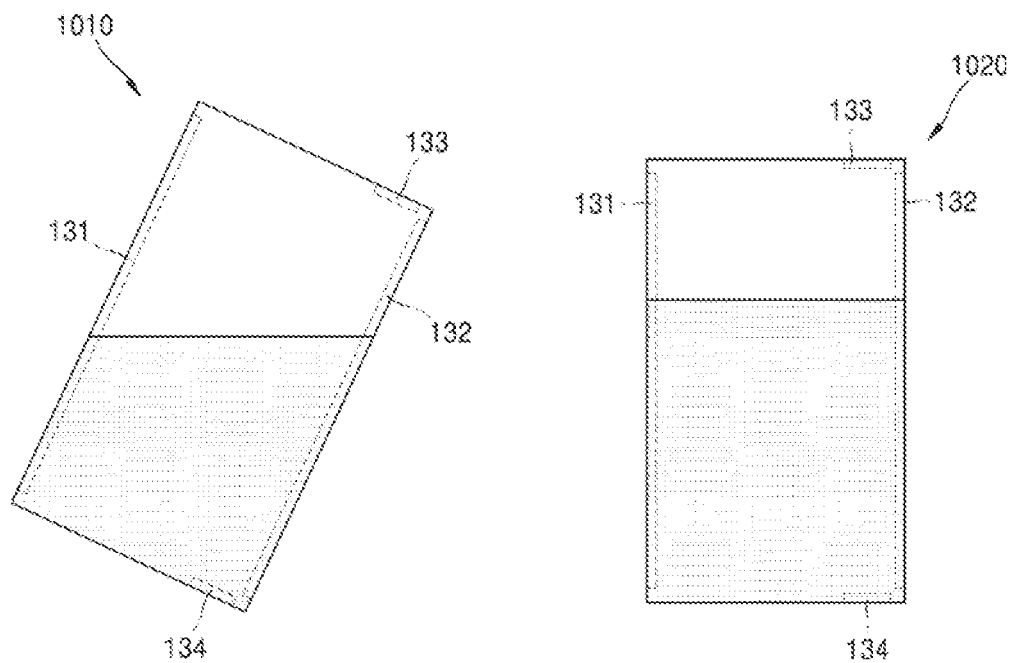

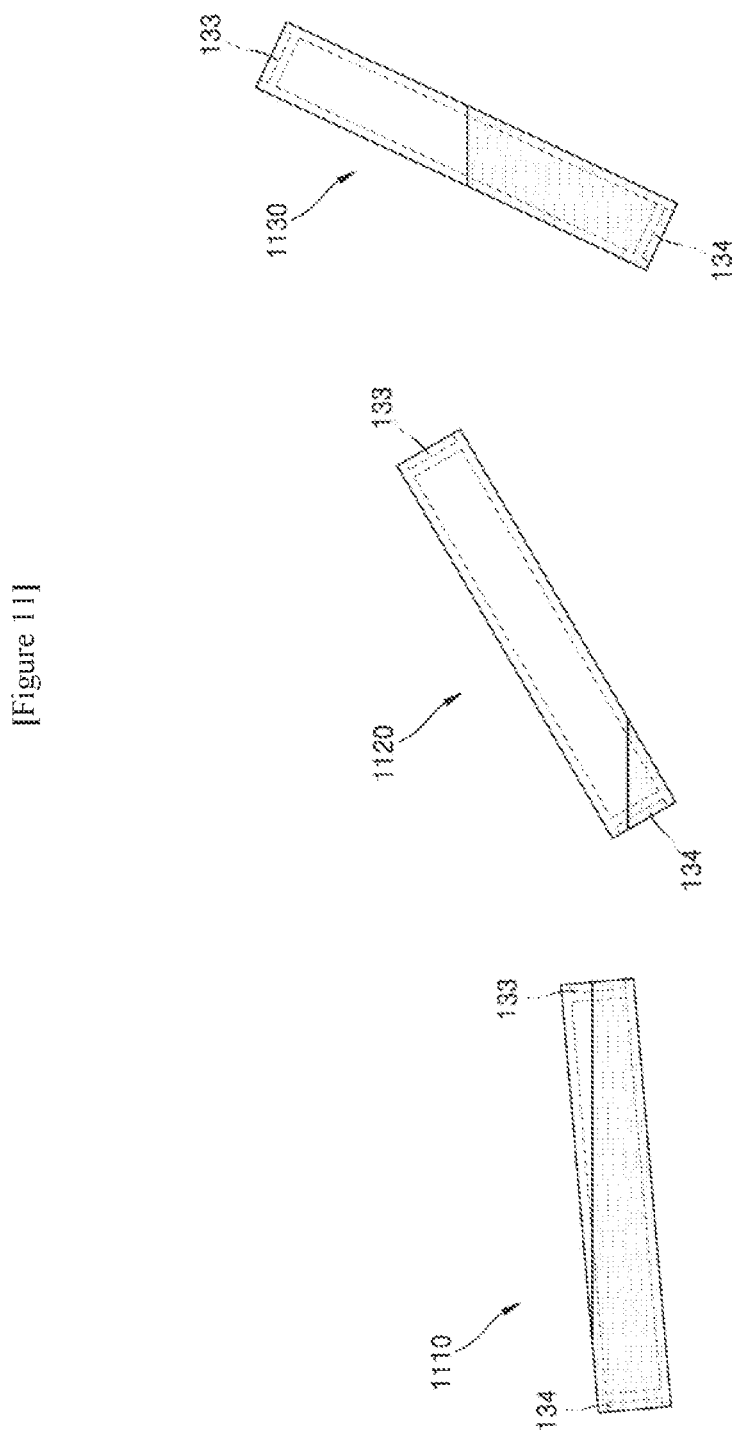
[Figure 11]

[Figure 12]
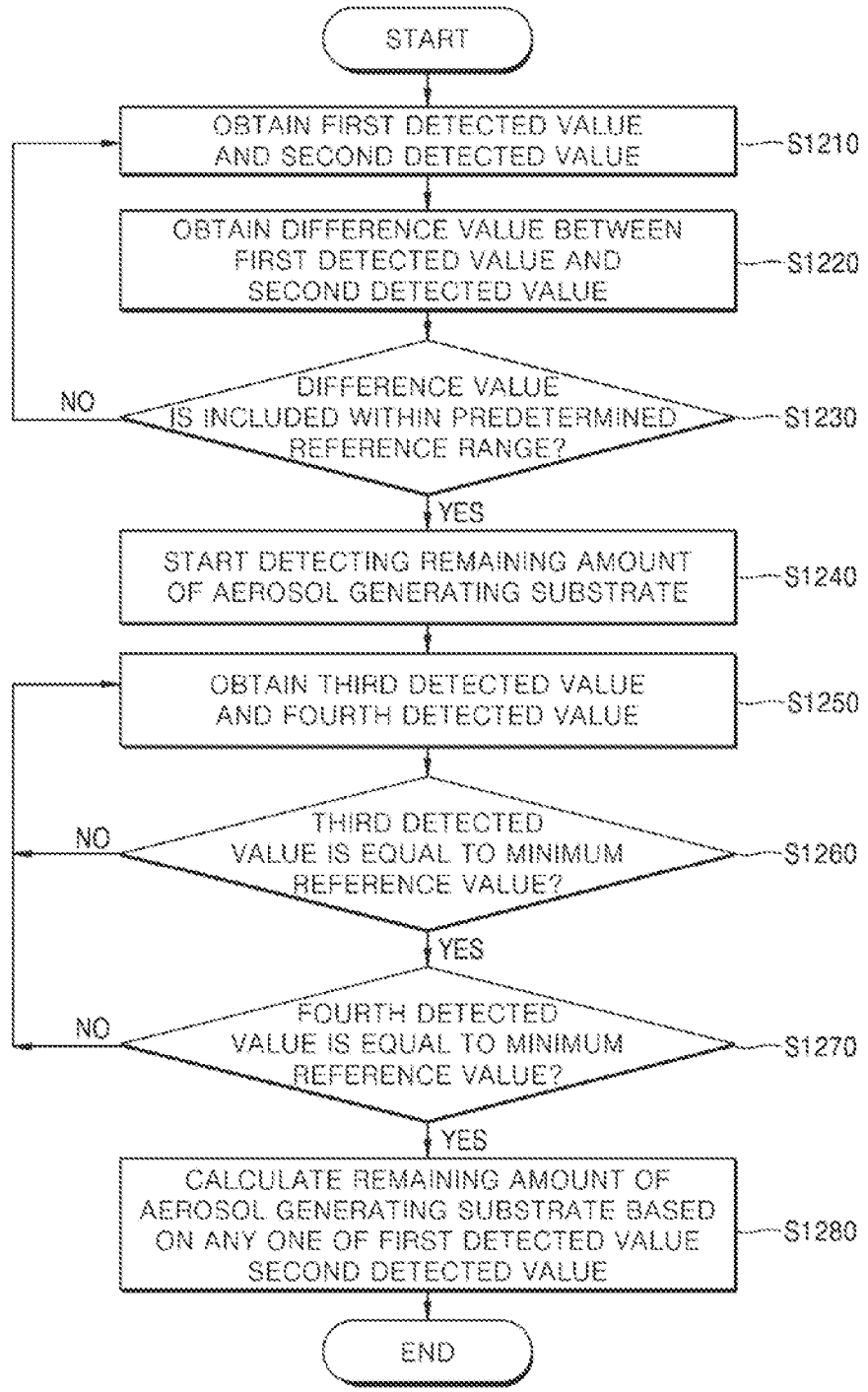

ed aerosol generating device that generates anaerosol generating device. Therefore,

AEROSOL GENERATING DEVICE

CROSS REFERENCE TO RELATED APPLICATIONS

This application is a National Stage of International Application No. PCT/KR2021/014783 filed Oct. 21, 2021, claiming priority based on Korean Patent Application No. 10-2020-0139288 filed Oct. 26, 2020.

TECHNICAL FIELD

One or more embodiments of the present disclosure relate to an aerosol generating device, and more particularly, to an aerosol generating device capable of accurately measuring an amount of an aerosol generating material.

BACKGROUND ART

In recent years, the demand for alternatives to a combustive cigarette has increased. For example, there is growing demand for an aerosol generating device that generates an aerosol by heating an aerosol generating material contained in a cigarette or a liquid storage without combustion.

Such an aerosol generating device is required to accurately measure a remaining amount of the aerosol generating material in order to notify a user of a replacement time of a cartridge or to provide the user with a uniform taste.

DISCLOSURE

Technical Problem

One or more embodiments of the present disclosure provide an aerosol generating device capable of accurately measuring a remaining amount of an aerosol generating material.

Additional aspects will be set forth in part in the description which follows and, in part, will be apparent from the description, or may be learned by the practice of the presented embodiments.

Technical Solution

An aerosol generating device according to an embodiment of the present disclosure includes a liquid storage configured to store an aerosol generating material, a first residual amount detection sensor and a second residual amount detection sensor respectively arranged on a first portion and a second portion of the liquid storage portion, a third residual amount detection sensor and a fourth residual amount detection sensor respectively arranged on a third portion and a fourth portion of the liquid storage, the third portion and the fourth portion being different from the first portion and the second portion; and a controller configured to measure a remaining amount of the aerosol generating material based on a first detected value output by the first residual amount detection sensor and a second detected value output by the second residual amount detection sensor.

Advantageous Effects

An aerosol generating device according to embodiments of the present disclosure measures a remaining amount of an aerosol generating material taking account of an inclination of a liquid stored in the aerosol generating device. Therefore, the remaining amount of the aerosol generating material may be measured more accurately.

In addition, the aerosol generating device notifies a user of an exact remaining amount of the aerosol generating material. Thus, user convenience may be increased.

Embodiments of the present disclosure are not limited thereto. It is to be appreciated that other embodiments will be apparent to those skilled in the art from consideration of the specification and the accompanying drawings of the present disclosure described herein.

DESCRIPTION OF DRAWINGS

FIG. 1 is an exploded perspective view schematically illustrating a coupling relationship between a replaceable cartridge containing an aerosol generating material and an aerosol generating device including the same, according to an embodiment.

FIG. 2 is a perspective view of an exemplary operating state of the aerosol generating device according to the embodiment illustrated in FIG. 1.

FIG. 3 is a perspective view of another exemplary operating state of the aerosol generating device according to the embodiment illustrated in FIG. 1.

FIG. 4 is an internal block diagram of an aerosol generating device according to an embodiment.

FIG. 5 is an internal block diagram of a residual amount detection sensor according to an embodiment.

FIG. 6 is a perspective view of a liquid storage according to an embodiment.

FIGS. 7 to 9 are side views of a liquid storage according to an embodiment.

FIG. 10 is a diagram illustrating a start condition for measuring a remaining amount of an aerosol generating material, according to an embodiment.

FIG. 11 is a diagram illustrating a method of calculating a remaining amount of an aerosol generating material, according to an embodiment.

FIG. 12 is a flowchart of a method of measuring a remaining amount of an aerosol generating material, according to an embodiment.

BEST MODE

An aerosol generating device according to an embodiment of the present disclosure includes a a liquid storage configured to store an aerosol generating material, a first residual amount detection sensor and a second residual amount detection sensor respectively arranged on a first portion and a second portion of the liquid storage portion, a third residual amount detection sensor and a fourth residual amount detection sensor respectively arranged on a third portion and a fourth portion of the liquid storage, the third portion and the fourth portion being different from the first portion and the second portion; and a controller configured to measure a remaining amount of the aerosol generating material based on a first detected value output by the first residual amount detection sensor and a second detected value output by the second residual amount detection sensor.

In addition, the first portion is a first inner surface of the liquid storage and the second portion is a second inner surface of the liquid storage that faces the first inner surface of the liquid storage.

In addition, the third portion is a third inner surface of the liquid storage different from the first inner surface and the second inner surface of the liquid storage, and the fourth portion is a fourth inner surface of the liquid storage that faces the third inner surface of the liquid storage.

In addition, the aerosol generating device further includes a mouthpiece coupled to an opposite surface of the third inner surface of the liquid storage.

In addition, the liquid storage further comprises a fifth inner surface and a sixth inner surface that face each other and connect the first inner surface and the second inner surface.

In addition, the first inner surface and the second inner surface of the liquid storage portion have a first surface area and the fifth inner surface and the sixth inner surface of the liquid storage portion have a second surface area, wherein the first surface area is smaller than the second surface area.

In addition, a cross-sectional shape of the liquid storage in a direction transverse to a longitudinal direction is rectangular.

In addition, an initial amount of the aerosol generating material stored in the liquid storage is set to 80% to 90% of a maximum capacity of the liquid storage.

In addition, the controller is further configured to start measuring the remaining amount of the aerosol generating material, when the difference between the first detected value and the second detected value is included within a predetermined reference range.

In addition, the controller is further configured to compare a third detected value detected by the third residual amount detection sensor and a fourth detected value detected by the fourth residual amount detection sensor, after starting to measure the remaining amount of the aerosol generating material, and calculate the remaining amount of the aerosol generating material further based on the third detected value and the fourth detected value.

In addition, the controller is further configured to calculate the remaining amount of the aerosol generating material based on at least any one of the first detected value and the second detected value, when the third detected value is equal to a predetermined minimum reference value and the fourth detected value is equal to a predetermined maximum reference value.

In addition, the aerosol generating device further includes a signal distributor configured to select and output any one of electrical signals detected by the first to fourth residual amount detection sensors, respectively, and a signal converter configured to convert the selected electrical signal into a digital signal.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 may be coupled to the main body 10 in a state in which the aerosol generating material is accommodated therein. A portion of the cartridge 20 is inserted into an accommodation space 19 of the main body 10 so that the cartridge 20 may be mounted on the main body 10.

The cartridge 20 may contain an aerosol generating material in any one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user.

Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 20 is operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, the cartridge 20 may convert the phase of the aerosol generating material by receiving the electrical signal from the main body 10 and heating the aerosol generating material, or by using an ultrasonic vibration method, or by using an induction heating method. As another example, when the cartridge 20 includes its own power source, the cartridge 20 may generate aerosol by being operated by an electric control signal or a wireless signal transmitted from the main body 10 to the cartridge 20.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material and that the liquid storage 21 includes therein an element impregnated with (containing) an aerosol generating material, such as a sponge, cotton, fabric, or porous ceramic structure.

The atomizer may include, for example, a liquid delivery element (wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like, and may be implemented by a conductive filament, wound on the liquid delivery element, or arranged adjacent to the liquid delivery element, by using a material such as a nichrome wire.

In addition, the atomizer may be implemented by a heating element in the form of a mesh or plate, which performs both the functions of absorbing the aerosol generating material and maintaining the same in an optimal state for conversion to aerosol without using a separate liquid delivery element and the function of generating aerosol by heating the aerosol generating material.

At least a portion of the liquid storage 21 of the cartridge 20 may include a transparent material so that the aerosol generating material accommodated in the cartridge 20 may be visually identified from the outside. The liquid storage 21 includes a protruding window 21a protruding from the liquid storage 21, so that the liquid storage 21 may be inserted into a groove 11 of the main body 10 when coupled to the main body 10. A mouthpiece 22 and the liquid storage 21 may be entirely formed of transparent plastic or glass, and only the protruding window 21a corresponding to a portion of the liquid storage 21 may be formed of a transparent material.

The main body 10 includes a connection terminal 10t arranged inside the accommodation space 19. When the liquid storage 21 of the cartridge 20 is inserted into the accommodation space 19 of the main body 10, the main body 10 may provide power to the cartridge 20 through the connection terminal 10t or supply a signal related to an operation of the cartridge 20 to the cartridge 20.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body 10 to move with respect to the main body 10. The slider 7 covers at least a portion of the mouthpiece 22 of the cartridge 20 coupled to the main body 10 or exposes at least a portion of the mouthpiece 22 to the outside by moving with respect to the main body 10. The slider 7 includes an elongated hole 7a exposing at least a portion of the protruding window 21a of the cartridge 20 to the outside.

The slider 7 has a container shape with a hollow space therein and both ends opened. The structure of the slider 7 is not limited to the container shape as shown in the drawing, and the slider 7 may have a bent plate structure having a clip-shaped cross-section, which is movable with respect to the main body 10 while being coupled to an edge of the main body 10, or a structure having a curved semi-cylindrical shape and a curved arc-shaped cross section.

The slider 7 includes a magnetic body for maintaining the position of the slider 7 with respect to the main body 10 and the cartridge 20. The magnetic body may include a permanent magnet or a material such as iron, nickel, cobalt, or an alloy thereof.

The magnetic body includes two first magnetic bodies 8a facing each other with an inner space of the slider 7 therebetween, and two second magnetic bodies 8b facing each other with the inner space of the slider 7 therebetween. The first magnetic bodies 8a and the second magnetic bodies 8b are arranged to be spaced apart from each other along a longitudinal direction of the main body 10, which is a moving direction of the slider 7, that is, the direction in which the main body 10 extends.

The main body 10 includes a fixed magnetic body 9 arranged on a path along which the first magnetic bodies 8*a* and the second magnetic bodies 8*b* of the slider 7 move while the slider 7 moves with respect to the main body 10. Two fixed magnetic bodies 9 of the main body 10 may be mounted to face each other with the accommodation space 19 there between.

Depending on the position of the slider 7, the slider 7 may be stably maintained in a position where an end of the mouthpiece 22 is covered or exposed by a magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*b* of the slider 7 move while the slider 7 moves with respect to the main body 10. The position change detecting sensor 3 may include, for example, a Hall IC using the Hall effect that detects a change in a magnetic field and generates a signal.

In the aerosol generating device 5 according to the above-described embodiments, the main body 10, the cartridge 20, and the slider 7 have approximately rectangular cross-sectional shapes in a direction transverse to the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly when extending in the longitudinal direction, and may extend a long way while being curved in a streamlined shape or bent at a preset angle in a specific area to be easily held by the user.

FIG. 2 is a perspective view of an exemplary operating state of the aerosol generating device according to the embodiment illustrated in FIG. 1.

In FIG. 2, the operating state is shown in which the slider 7 is moved to a position where the end of the mouthpiece 22 of the cartridge coupled to the main body 10 is covered. In a state where the slider 7 is moved to the position where the end of the mouthpiece 22 is covered, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In a state where the slider 7 is moved to the position where the end of the mouthpiece 22 is exposed to the outside, the user may insert the mouthpiece 22 into his or her mouth and absorb aerosol discharged through the discharge hole 22*a* of the mouthpiece 22.

Even when the slider 7 is moved to the position where the end of the mouthpiece 22 is exposed to the outside, the protruding window 21*a* of the cartridge is exposed to the outside through the elongated hole 7*a* of the slider 7, and thus, the user may visually check the remaining amount of aerosol generating material contained in the cartridge.

FIG. 4 is an internal block diagram of an aerosol generating device, according to an embodiment.

Referring to FIG. 4, the aerosol generating device 5 may include a battery 110, a heater 120, a detector 130, a user interface 140, a memory 150, and a controller 160. However, an internal structure of the aerosol generating device 5 is not limited to the descriptions given in FIG. 4. Those of ordinary skill in the art related to the present embodiment may understand that according to a design of the aerosol generating device 5, some of the components shown in FIG. 4 may be omitted or new components may be further added thereto.

According to an embodiment, the aerosol generating device 5 may consist of only a body without a cartridge. In this case, hardware components of the aerosol generating device 5 are located on the body. According to another embodiment, the aerosol generating device 5 may consist of the body and a cartridge, and the hardware components of the aerosol generating device 5 may be distributively located on the body and the cartridge. Alternatively, at least some of the hardware components included in the aerosol generating device 5 may be located on the body as well as the cartridge.

Hereinafter, an operation of each component will be described without limiting a space in which each component included in the aerosol generating device 5 is located.

The battery 110 supplies power used for the aerosol generating device 5 to operate. In other words, the battery 110 may supply power such that the heater 120 is heated. The battery 110 may also supply power necessary for other hardware components included in the aerosol generating device 5, such as the detector 130, the user interface 140, the memory 150, and the controller 160 to operate. The battery 110 may be a rechargeable battery or a disposable battery. For example, the battery 110 may be a lithium polymer (LiPoly) battery. However, embodiments of the present disclosure are not limited thereto.

The heater 120 receives power from the battery 110 under the control of the controller 160. The heater 120 may receive power from the battery 110 to heat a cigarette inserted into the aerosol generating device 5 or the cartridge mounted on the aerosol generating device 5.

The heater 120 may be located on the body of the aerosol generating device 5. Alternatively, when the aerosol generating device 5 consists of the body and the cartridge, the heater 120 may be located in the cartridge. When the heater 120 is located on the cartridge, the heater 120 may receive power from the battery 110 located on at least any one of the body and the cartridge.

The heater 120 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 120 may be implemented by a metal hot wire, a metal hot plate on which an electrically conductive track is arranged, a ceramic heating element, or the like, but is not limited thereto.

According to an embodiment, the heater 120 may be included in the cartridge 20. The cartridge 20 may include the heater 120, a liquid delivery means, and the liquid storage 21. An aerosol generating material accommodated in the liquid storage 21 may move to the liquid delivery means, and the heater 120 may heat the aerosol generating material absorbed in the liquid delivery means to generate an aerosol. For example, the heater 120 may include a material such as nickel chromium and may be wound around the liquid delivery means or arranged adjacent to the liquid delivery means.

The heater 120 may be an induction heating-type heater. The heater 120 may include an electrically conductive coil to heat the cartridge 20 in an induction heating manner, and the cartridge 20 may include a susceptor capable of being heated by an induction heating-type heater.

The aerosol generating device 5 may include the detector 130. A detected signal detected by the detector 130 may be transmitted to the controller 160, and according to the detection signal, the controller 160 may control the aerosol generating device 5 to perform various functions such as controlling an operation of the heater 120, restricting smoking, determining whether or not the cartridge 20 is being inserted, displaying a remaining amount of the liquid storage 21, and displaying notification.

For example, the detector 130 may include a puff detection sensor configured to detect a user's puff, a temperature detection sensor configured to detect a temperature of the heater 120, and a location change detection sensor configured to detect a change in a location of the slider 7, and the like.

In particular, the detector 130 may include a plurality of residual amount detection sensors (131 to 134 of FIG. 5, hereinafter collectively referred to as 131 when there is no need to distinguish them). The residual amount detection sensors 131 may detect a remaining amount of the aerosol generating material stored in the liquid storage 21. An operation method of the residual amount detection sensors 131 will be described in greater detail below with reference to FIG. 5.

The user interface 140 may provide the user with information on a state of the aerosol generating device 5. The user interface 140 may include various interfacing means such as a display or lamp for outputting visual information, a motor for outputting tactile information, a speaker for outputting sound information, an input/output (I/O) interfacing means (e.g., button or touch screen) for receiving information input from the user or outputting information to the user, terminals for data communication or for receiving charging power, a communication interfacing module for performing wireless communication with an external device (e.g., wireless fidelity (Wi-Fi), Wi-Fi direct, blue-tooth, near-field communication (NFC)), and the like.

However, the aerosol generating device 5 may be implemented by selecting only some of the various examples of the user interface 140 exemplified above.

The memory 150 is hardware configured to store various types of data processed in the aerosol generating device 5, and may store data processed and data to be processed by the controller 160. The memory 150 may be implemented by a variety of types including random access memory (RAM) such as dynamic random access memory (DRAM), static random access memory (SRAM), read-only memory (ROM), electrically erasable programmable read-only memory (EEPROM), and the like.

In particular, when the detector 130 includes the plurality of residual amount detection sensors 131, the memory 150 may store a start condition for measuring a remaining amount of the aerosol generating material. The start condition for measuring the remaining amount of the aerosol generating material will be described later with reference to FIG. 6.

The controller 160 is hardware configured to control the overall operation of the aerosol generating device 5. The controller 160 may include at least one processor. The processor may be implemented by an array of a plurality of logic gates, or may be implemented by a combination of a microprocessor and a memory in which a program executable in the microprocessor is stored. In addition, those of ordinary skill in the art to which the present embodiment pertains may understand that the controller 160 may be implemented by a combination of other forms.

The controller 160 may analyze a result of detection by the detector 130 and control processes to be performed subsequently.

The controller 160 may control power supply to the heater 120 to start or end an operation of the heater 120 based on the result of detection by the detector 130. In addition, based on the result of detection by the detector 130, the controller 160 may control an amount and a time of the power supply to the heater 120 such that the heater 120 is heated to a certain temperature or maintained at an appropriate temperature.

Although not shown in FIG. 4, the aerosol generating device 5 may constitute an aerosol generating system together with a separate cradle. For example, the cradle may be used to charge the battery 110 of the aerosol generating device 5. For example, the aerosol generating device 5 may receive power from a battery of the cradle to charge the battery 110 of the aerosol generating device 5 while being accommodated in an accommodation space in the cradle.

FIG. 5 is an internal block diagram of a residual amount detection sensor, according to an embodiment.

Referring to FIG. 5, the detector 130 may include a first residual amount detection sensor 131, a second residual amount detection sensor 132, a third residual amount detection sensor 133, and a fourth residual amount detection sensor 134.

The first residual amount detection sensor 131 to the fourth residual amount detection sensor 134 may be arranged in the liquid storage 21. The first residual amount detection sensor 131 to the fourth residual amount detection sensor 134 may detect a change in electrical characteristics according to a movement of an aerosol generating material. For example, the first residual amount detection sensor 131 to the fourth residual amount detection sensor 134 may be capacitive sensors. A capacitive sensor may detect a change in capacitance according to the movement of the aerosol generating material in liquid form.

The first residual amount detection sensor 131 to the fourth residual amount detection sensor 134 may convert the change in the electrical characteristics according to the movement of the aerosol generating material into an electrical signal and output the electrical signal.

The first residual amount detection sensor 131 to the fourth residual amount detection sensor 134 may consist of 4 channel (ch). To that end, the aerosol generating device 5 may further include a signal distributor 170 and a signal converter 180.

The signal distributor 170 may select any one of electrical signals output by the first residual amount detection sensor 131 to the fourth residual amount detection sensor 134 and transmit the selected electrical signal to the signal converter 180. For example, the signal distributor 170 may include a multiplexer.

The signal converter 180 may convert the electrical signal provided from the signal distributor 170 into a digital signal to transmit the same to the controller 160. For example, the signal converter 180 may include an analog-to-digital converter (ADC).

According to an embodiment, the first residual amount detection sensor 131 to the fourth residual amount detection sensor 134, the signal distributor 170, and the signal converter 180 may be configured as one sensor module. In that case, the entire sensor module may be referred to as a residual amount detection sensor.

Since the converted electrical signal output by the signal converter 180 is an electrical signal generated based on the change in the electrical characteristics detected by the first residual amount detection sensor 131 to the fourth residual amount detection sensor 134, the converted electrical signal may be referred to as a detected value detected by the first residual amount detection sensor 131 to the fourth residual amount detection sensor 134.

The controller 160 may calculate an amount of the aerosol generating material based on at least any one of detected values detected by the first residual amount detection sensor 131 to the fourth residual amount detection sensor 134.

The aerosol generating device 5 according to embodiments of the present disclosure may use residual amount detection sensors of 4 ch to determine an arrangement direction according to an inclination of the aerosol generating device 5 and calculate the remaining amount of the aerosol generating material based on the arrangement direction. Therefore, the remaining amount of the aerosol generating material may be accurately measured. Hereinafter, a method of measuring the remaining amount of the aerosol generating material according to the inclination of the aerosol generating device 5 will be described.

FIG. 6 is a perspective view of a liquid storage according to an embodiment, and FIGS. 7 to 9 are side views of a liquid storage according to an embodiment.

More specifically, FIG. 7 is a side view of the liquid storage 21 of FIG. 6 viewed in A direction, FIG. 8 is a side view of the liquid storage 21 of FIG. 6 viewed in B direction, and FIG. 9 is a side view of the liquid storage 21 of FIG. 6 viewed in C direction.

FIGS. 6 to 9 only show some components for illustrating a method of estimating a remaining amount of an aerosol generating material. Therefore, even if not shown in FIGS. 6 to 9, the components described with reference to FIGS. 1 to 5 may be arranged in the liquid storage 21 of FIGS. 6 to 9.

Referring to FIGS. 6 to 9, the liquid storage 21 may have a rectangular cross-sectional shape when cut in a direction transverse to a longitudinal direction. In that case, the longitudinal direction may refer to a direction from one end portion of the liquid storage 21 to which the mouthpiece 22 is coupled toward another end portion of the liquid storage 21 in contact with the connection terminal 10t of the body 10.

The liquid storage 21 may include a first inner surface 610 and a second inner surface 620 facing each other. The liquid storage 21 may also include a fifth inner surface 650 and a sixth inner surface 660 facing each other. The distance d between the fifth inner surface 650 and the sixth inner surface 660 may be set to be smaller than the distance 1 between the first inner surface 610 and the second inner surface 620. For example, the distance 1 between the first inner surface 610 and the second inner surface 620 may be set to be three to six times the distance d between the fifth inner surface 650 and the sixth inner surface 660.

The first residual amount detection sensor 131 and the second residual amount detection sensor 132 may be arranged respectively on a first inner surface 610 and a second inner surface 620 of the liquid storage 21 that face each other among inner surfaces 610, 620, 630, 640, 650, and 660 of the liquid storage 21.

The first residual amount detection sensor 131 may be arranged on the first inner surface 610 and extend in the longitudinal direction. The second residual amount detection sensor 132 may be arranged on the second inner surface 620 and extend in the longitudinal direction.

The third residual amount detection sensor 133 and the fourth residual amount detection sensor 134 may be arranged respectively on the third inner surface 630 and the fourth inner surface 640 of the liquid storage 21 that face each other and are different from the first inner surface 610 and the second the inner surface 620 among the inner surfaces 610, 620, 630, 640, 650, and 660 of the liquid storage 21.

The third residual amount detection sensor 133 may be arranged at a portion of the third inner surface 630. The fourth residual amount detection sensor 134 may be arranged at a portion of the fourth inner surface 640. The reason why the third residual amount detection sensor 133 and the fourth residual amount detection sensor 134 do not extend on the entire area of the third inner surface 630 and the fourth inner surface 640 is because of the arrangement of the discharge hole 22a for discharging an aerosol to the outside and a connection terminal (not shown) for providing an interface with the connection terminal 10t of the body 10.

An outer surface of the third inner surface 630 corresponding to the third inner surface 630 may be coupled to the mouthpiece 22.

An initial amount of an aerosol generating material stored in the liquid storage 21 may be set to 80% to 90% of a maximum capacity of the liquid storage 21 to accommodate the aerosol generating material. The initial amount may refer to an amount of the aerosol generating material stored in the liquid storage 21 at the time of shipment from a factory. Since the initial amount of the liquid storage 21 is set to 80% to 90% of the maximum capacity, the third residual amount detection sensor 133 may not contact the aerosol generating material in an upright state of the aerosol generating device 5 (i.e., the liquid storage 21). In other words, in the upright state of the aerosol generating device 5, the third residual amount detection sensor 133 may be arranged above a highest level of an aerosol generating material. The upright state may refer to a state in which a ground surface and the third inner surface 630 and/or the fourth inner surface 640 are parallel to each other. Hereinafter, upright may have the same meaning as horizontal. As will be described later, by setting the initial amount of the aerosol generating material to 80% to 90% of the maximum capacity of the liquid storage 21, a tilt of the aerosol generating device 5 may be detected.

No residual amount detection sensors may be arranged on the fifth inner surface 650 and the sixth inner surface 660 that face each other and connect the first inner surface 610 and the second inner surface 620 among the inner surfaces 610, 620, 630, 640, 650, and 660 of the liquid storage 21.

The first inner surface 610 and the second inner surface 620 may be formed in the same shape. The fifth inner surface 650 and the sixth inner surface 660 may be formed in the same shape. The first inner surface 610 and the second inner surface 620, and the fifth inner surface 650 and the sixth inner surface 660 may have the same height and different widths. In that case, the height may refer to a dimension along the longitudinal direction.

The first inner surface 610 and the second inner surface 620 may have a first surface area, and the fifth inner surface 650 and the sixth inner surface 660 may have a second surface area. The first surface area may be set to be smaller than the second surface area. That is, assuming that the first inner surface 610, the second inner surface 620, the fifth inner surface 650, and the sixth inner surface 660 have the same height, the width d of the first inner surface 610 and the second inner surface 620 may be smaller than the width 1 of the fifth inner surface 650 and the sixth inner surface 660.

In other words, the first residual amount detection sensor 131 and the second residual amount detection sensor 132 are respectively arranged on narrow side surfaces among the inner surfaces of the liquid storage 21. Therefore, when the aerosol generating device 5 is tilted in a certain direction, there may be negligible difference between an actual remaining amount and a measured remaining amount of the aerosol generating material.

The first residual amount detection sensor 131 to the fourth residual amount detection sensor 134 may detect a change in electrical characteristics according to a movement of the aerosol generating material. For example, the first residual amount detection sensor 131 to the fourth residual amount detection sensor 134 may be capacitive sensors. A capacitive sensor may detect a change in capacitance according to the movement of the aerosol generating material in liquid form.

The first residual amount detection sensor 131 to the fourth residual amount detection sensor 134 may convert the change in the electrical characteristics according to the movement of the aerosol generating material into an electrical signal and output the electrical signal. The electrical signal may be converted and provided to the controller 160. For example, the controller 160 may receive a detected value in the form of a voltage.

The detected values output by the first residual amount detection sensor 131 to the fourth residual amount detection sensor 134 to the controller 160 may increase in proportion to the remaining amount of the aerosol generating material. The controller 160 may calculate a remaining amount of the aerosol generating material based on the detected values.

The aerosol generating device 5 may calculate the remaining amount of the aerosol generating material in an upright state. Therefore, when the liquid storage 21 tilts in Y1 direction and Y2 direction in FIG. 6, there is no difference between the measured remaining amount of the aerosol generating material calculated by the controller 160 and the actual remaining amount of the aerosol generating material.

In addition, the first residual amount detection sensor 131 and the second residual amount detection sensor 132 are respectively arranged on the narrow side surfaces among the inner surfaces of the liquid storage 21. Therefore, when the liquid storage 21 tilts in P1 direction and P2 direction, there may be negligible difference between the measured remaining amount of the aerosol generating material calculated by the controller 160 and the actual remaining amount of the aerosol generating material.

However, when the liquid storage 21 tilts in R1 direction and R2 direction, the difference between the measured remaining amount of the aerosol generating material calculated by the controller 160 and the actual remaining amount of the aerosol generating material may be significantly large.

According to embodiments of the present disclosure, the remaining amount of the aerosol generating material may be accurately determined by taking account of an inclination of the liquid storage 21 as described above.

FIGS. 6 to 9 only illustrate that the cross-sectional shape of the liquid storage 21 when cut in a direction transverse to the longitudinal direction (i.e., horizontal cross-sectional shape of the liquid storage 21) is rectangular. However, embodiments of the present disclosure are not limited thereto. For example, the horizontal cross-sectional shape of the liquid storage 21 may be circular, elliptical, or polygonal. In that case, the first inner surface 610, the second inner surface 620, the third inner surface 630, the fourth inner surface 640, the fifth inner surface 650, and the sixth inner surface 660 may correspond to a first portion, a second portion, a third portion, a fourth portion, a fifth portion, and a sixth portion, respectively.

FIG. 10 is a diagram illustrating a start condition for measuring a remaining amount of an aerosol generating material, according to an embodiment.

As described above, when the liquid storage 21 tilts in the R1 direction and the R2 direction of FIG. 6, a difference between a measured remaining amount of the aerosol generating material calculated by the controller 160 and an actual remaining amount of the aerosol generating material may be significantly large.

The aerosol generating device 5 according to embodiments of the present disclosure may start measuring the remaining amount of the aerosol generating material based on detected values of the first residual amount detection sensor 131 and the second residual amount detection sensor 132 arranged on side surfaces of the liquid storage 21.

More specifically, FIG. 10 illustrates a diagram 1010 showing a state of the aerosol generating material when the liquid storage 21 tilts in the R2 direction of FIG. 6 and a diagram 1020 showing a state of the aerosol generating material when a first detected value detected by the first residual amount detection sensor 131 and a second detected value detected by the second residual amount detection sensor 132 are the same.

As illustrated in the diagram 1010, when the liquid storage 21 tilts in the R2 direction, the difference between a first detected value detected by the first residual amount detection sensor 131 and a second detected value detected by the second residual amount detection sensor 132. In this case, if the controller 160 measures the remaining amount of the aerosol generating material based on the first value or the second value alone, the measured residual amount of the aerosol generating material calculated by the controller 160 may not be accurate. As a result, a user may not be informed of an exact replacement timing of the cartridge 20.

Therefore, the controller 160 may not start measuring the remaining amount of the aerosol generating material until the liquid storage 21 is in an upright state.

As illustrated in the diagram 1020, when a difference between the first detected value and the second detected value is included within a predetermined reference range, the controller 160 may start measuring the remaining amount of the aerosol generating material.

The reference range may be appropriately set by taking account of a capacity of the liquid storage 21, a viscosity of the aerosol generating material, and the like. For example, when a detected value is a voltage, the reference range may be set to 0.2 V to 0.8 V. However, embodiments of the present disclosure are not limited thereto.

According to an embodiment, when the difference between the first detected value and the second detected value is included within the predetermined reference range, the controller 160 may calculate the remaining amount of the aerosol generating material based on at least any one of the first detected value and the second detected value. For example, the controller 160 may calculate the remaining amount of the aerosol generating material based on a smaller value between the first detected value and the second detected value. As another example, the controller 160 may calculate the remaining amount of the aerosol generating material based on an average value of the first detected value and the second detected value.

On the other hand, when the controller 160 calculates the remaining amount of the aerosol generating material by only taking account of a tilt in the R1 and R2 directions of FIG. 6, the remaining amount of the aerosol generating material may not be accurately measured. Therefore, the controller 160 according to embodiments of the present disclosure may calculate the remaining amount of the aerosol generating material by further taking account of a tilt in the P1 and P2 directions of FIG. 6.

FIG. 11 is a diagram illustrating a method of calculating a remaining amount of an aerosol generating material, according to an embodiment.

Referring to FIG. 11, FIG. 11 illustrates a diagram 1110 showing a state of the aerosol generating material when the liquid storage 21 tilts at a first angle in the direction P2 of FIG. 6, a diagram 1210 showing a state of the aerosol generating material when the liquid storage 21 tilts at a second angle smaller than the first angle in the P2 direction of FIG. 6, and a diagram 1310 showing a state of the aerosol generating material when the liquid storage 21 tilts at a third angle smaller than the second angle in the P2 direction of FIG. 6.

As shown in the diagrams 1100 and 1120, when the liquid storage 21 tilts at the first angle or the second angle in the P2 direction of FIG. 6, a measured remaining amount of the aerosol generating material calculated by the controller 160 based on sensing of the first residual amount detection sensor 131 and the second residual amount detection sensor 132 may not be accurate. In this case, a user may not be informed of an exact replacement timing of the cartridge 20.

Therefore, the controller 160 may not calculate the remaining amount of the aerosol generating material until the difference between the measured remaining amount of the aerosol generating material and the actual remaining amount of the aerosol generating material becomes significantly small (i.e., until the liquid storage 21 is in the upright state).

More specifically, the controller 160 may not calculate the remaining amount of the aerosol generating material unless a third detected value detected by the third residual amount detection sensor 133 corresponds to a predetermined minimum reference value and a fourth detected value detected by the fourth residual amount detection sensor 134 corresponds to a predetermined maximum reference value.

The minimum reference value may be set based on a detected value provided from the third residual amount detection sensor 133 while the third residual amount detection sensor 133 does not come into contact with the aerosol generating material. For example, when the detected value provided by the controller 160 from the third residual amount detection sensor 133 is 0 V while the third residual amount detection sensor 133 does not come into contact with the aerosol generating material, the minimum reference value may be set to 0.02 mV to 0.06 mV. However, embodiments of the present disclosure are not limited thereto.

The maximum reference value may be set based on a detected value provided from the fourth residual amount detection sensor 134 while an entire exposed surface of the fourth residual amount detection sensor 134 is in contact with the aerosol generating material. For example, when the detected value provided by the controller 160 from the fourth residual amount detection sensor 134 is 5 V while the entire exposed surface of the fourth residual amount detection sensor 134 is in contact with the aerosol generating material, the maximum reference value may be set to 4.9 V to 5 V. However, embodiments of the present disclosure are not limited thereto.

In other words, the controller 160 may calculate the remaining amount of the aerosol generating material when the entire exposed surface of the fourth residual amount detection sensor 134 arranged on a lower surface of the liquid storage 21 is substantially in contact with the aerosol generating material and an entire exposed surface of the third residual amount detection sensor 133 arranged on an upper surface of the liquid storage 21 is not substantially in contact with the aerosol generating material.

Since an initial amount of the liquid storage 21 is set to 80% to 90% of a maximum capacity, the third residual amount detection sensor 133 may not be in contact with the aerosol generating material from the time of shipment from a factory, in an upright state of the aerosol generating device 5. Therefore, the controller 160 may determine an inclination of the aerosol generating material from the time of the shipment from the factory and calculate the remaining amount of the aerosol generating material according to a degree of the inclination.

As shown in the diagram 1130, when the liquid storage 21 tilts at the third angle in the direction P2 of FIG. 6, the third detected value corresponds to the predetermined minimum reference value and the fourth detected value corresponds to the predetermined maximum reference value. Although the aerosol generating device 5 is still tilted at the third angle, since the first residual amount detection sensor 131 and the second residual amount detection sensor 132 are respectively arranged on narrow side surfaces of the liquid storage 21, the difference between the actual remaining amount of the aerosol generating material and the measured remaining amount of the aerosol generating material calculated by the controller 160 according to the first residual amount detection sensor 131 and the second residual amount detection sensor 132 may be negligible.

Therefore, as shown in the diagram 1130, when the third detected value corresponds to the predetermined minimum reference value and the fourth detected value corresponds to the predetermined maximum reference value, the controller 160 may calculate the remaining amount of the aerosol generating material based on at least any one of the first detected value detected by the first residual amount detection sensor 131 and the second detected value detected by the second residual amount detection sensor 132. For example, the controller 160 may calculate the remaining amount of the aerosol generating material based on a smaller value between the first detected value and the second detected value. As another example, the controller 160 may calculate the remaining amount of the aerosol generating material based on an average value of the first detected value and the second detected value.

FIG. 12 is a flowchart of a method of measuring a remaining amount of an aerosol generating material, according to an embodiment.

Referring to FIG. 12, the controller 160 may obtain a first detected value and a second detected value, in operation S1210.

The first detected value may be a signal generated based on a change in electrical characteristics detected by the first residual amount detection sensor 131. The second detected value may be a signal generated based on a change in the electrical characteristics detected by the second residual amount detection sensor 132. For example, the first detected value and the second detected value may be provided to the controller 160 in the form of a voltage.

In operation S1220, the controller 160 may obtain a difference value between the first detected value and the second detected value.

For example, the controller 160 may calculate a voltage difference between a voltage of the first detected value and a voltage of the second detected value.

In operation S1230, the controller 160 may determine whether the difference value between the first detected value and the second detected value is included within a predetermined reference range.

The reference range may be appropriately set by taking account of a capacity of the liquid storage 21, a viscosity of the aerosol generating material, and the like. For example, when a detected value is a voltage, the reference range may be set to 0.2 V to 0.8 V. However, embodiments of the present disclosure are not limited thereto.

When the difference between the first detected value and the second detected value does not fall within the predetermined reference range, the controller 160 may obtain new first and second detected values again.

In operation S1240, when the difference between the first detected value and the second detected value falls within the predetermined reference range, the controller 160 may start detecting a remaining amount of an aerosol generating material.

In operation S1250, the controller 160 may obtain a third detected value and a fourth detected value.

The third detected value may be a signal generated based on a change in the electrical characteristics detected by the third residual amount detection sensor 133. The fourth detected value may be a signal generated based on a change in the electrical characteristics detected by the fourth residual amount detection sensor 134. For example, the third detected value and the fourth detected value may be provided to the controller 160 in the form of a voltage.

In operation S1260, the controller 160 may determine whether the third detected value is equal to a minimum reference value.

When the third detected value is not equal to the minimum reference value, the controller 160 may obtain new third and fourth detected values again.

In operation S1270, the controller 160 may determine whether the fourth detected value is equal to a maximum reference value while the third detected value is equal to the minimum reference value.

When the fourth detected value is not the same as the minimum reference value, the controller 160 may obtain new third and fourth detected values again.

The order of operations S1260 and S1270 is not limited to that shown in FIG. 12. In other words, operation S1260 may be performed after operation S1270.

In operation S1280, when the third detected value is equal to the minimum reference value and the fourth detected value is equal to the maximum reference value, the controller 160 may calculate the remaining amount of the aerosol generating material based on any one of the first detected value and the second detected value.

When the third detected value is equal to the minimum reference value and the fourth detected value is equal to the maximum reference value, the controller 160 may determine that the aerosol generating device 5 is almost in an upright state to calculate the remaining amount of the aerosol generating material.

For example, the controller 160 may calculate the remaining amount of the aerosol generating material based on a smaller value between the first detected value and the second detected value. As another example, the controller 160 may calculate the remaining amount of the aerosol generating material based on an average value of the first detected value and the second detected value.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
   a liquid storage configured to store an aerosol generating material;
   a first residual amount detection sensor and a second residual amount detection sensor respectively arranged on a first portion and a second portion of the liquid storage;
   a third residual amount detection sensor and a fourth residual amount detection sensor respectively arranged on a third portion and a fourth portion of the liquid storage, the third portion and the fourth portion being different from the first portion and the second portion; and
   a controller configured to:
   start measuring a remaining amount of the aerosol generating material when a difference between a first detected value output by the first residual amount detection sensor and a second detected value output by the second residual amount detection sensor is included within a predetermined reference range; and
   measure the remaining amount of the aerosol generating material based on the first detected value and the second detected value.

2. The aerosol generating device of claim 1, wherein the first portion is
   a first inner surface of the liquid storage and the second portion is a second inner surface of the liquid storage that faces the first inner surface of the liquid storage.

3. The aerosol generating device of claim 2, wherein the third portion is
a third inner surface of the liquid storage different from the first inner surface and the second inner surface of the liquid storage, and the fourth portion is a fourth inner surface of the liquid storage that faces the third inner surface of the liquid storage.

4. The aerosol generating device of claim 3, further comprising a mouthpiece coupled to an opposite surface of the third inner surface of the liquid storage.

5. The aerosol generating device of claim 3, wherein the liquid storage comprises a fifth inner surface and a sixth inner surface that face each other and connect the first inner surface and the second inner surface.

6. The aerosol generating device of claim 5, wherein
the first inner surface and the second inner surface of the liquid storage have a first surface area,
the fifth inner surface and the sixth inner surface of the liquid storage have a second surface area, and
the first surface area is smaller than the second surface area.

7. The aerosol generating device of claim 1, wherein a cross-sectional shape of the liquid storage in a direction transverse to a longitudinal direction is rectangular.

8. The aerosol generating device of claim 1, wherein an initial amount of the aerosol generating material stored in the liquid storage is set to 80% to 90% of a maximum capacity of the liquid storage.

9. The aerosol generating device of claim 1, wherein the controller is further configured to compare a third detected value detected by the third residual amount detection sensor and a fourth detected value detected by the fourth residual amount detection sensor, after starting to measure the remaining amount of the aerosol generating material, and calculate the remaining amount of the aerosol generating material further based on the third detected value and the fourth detected value.

10. The aerosol generating device of claim 9, wherein the controller is further configured to calculate the remaining amount of the aerosol generating material based on at least any one of the first detected value and the second detected value, when the third detected value is equal to a predetermined minimum reference value and the fourth detected value is equal to a predetermined maximum reference value.

11. The aerosol generating device of claim 1, further comprising a signal distributor configured to select and output any one of electrical signals detected by the first to fourth residual amount detection sensors, respectively, and a signal converter configured to convert the selected electrical signal into a digital signal.

* * * * *